United States Patent
Hrubes et al.

(10) Patent No.: US 6,822,442 B2
(45) Date of Patent: Nov. 23, 2004

(54) SENSOR ARRANGEMENT FOR DETECTING PROPERTIES OF A TARGET

(75) Inventors: Franz Hrubes, Rottalmunster (DE); Norbert Reindl, Furstenzell (DE)

(73) Assignee: Micro-Epsilon Messtechnik GmbH & Co. KG, Ortenburg (DE)

( * ) Notice: Subject to any disclaimer, the term of this patent is extended or adjusted under 35 U.S.C. 154(b) by 0 days.

(21) Appl. No.: 10/408,989

(22) Filed: Apr. 8, 2003

(65) Prior Publication Data

US 2003/0169036 A1 Sep. 11, 2003

Related U.S. Application Data

(63) Continuation of application No. PCT/DE01/03031, filed on Aug. 8, 2001.

(30) Foreign Application Priority Data

Oct. 9, 2000 (DE) .......................................... 100 50 193

(51) Int. Cl.[7] .............................................. G01N 27/90
(52) U.S. Cl. ...................... 324/234; 324/226; 324/227
(58) Field of Search ................................ 324/662, 671, 324/686, 691, 226, 227, 67, 234, 238, 262; 174/35 MS

(56) References Cited

U.S. PATENT DOCUMENTS

| 4,168,464 | A | * | 9/1979 | Coulson et al. ............. 324/725 |
| 4,686,454 | A | * | 8/1987 | Pecukonis ..................... 324/67 |
| 4,853,617 | A | * | 8/1989 | Douglas et al. ................ 324/67 |
| 4,859,931 | A | * | 8/1989 | Yamashita et al. ............ 324/67 |
| 4,992,741 | A | * | 2/1991 | Douglas et al. ............. 324/671 |
| 5,302,894 | A | | 4/1994 | Hrubes |
| 5,519,944 | A | | 5/1996 | Delastre |
| 5,525,903 | A | | 6/1996 | Mandl et al. |
| 5,717,332 | A | | 2/1998 | Hedengren et al. |

FOREIGN PATENT DOCUMENTS

| DE | 31 34 342 A1 | 3/1983 |
| EP | 0 556 682 A1 | 8/1993 |
| EP | 0 918 211 A1 | 5/1999 |
| FR | 1 318 027 A | 5/1963 |
| WO | WO 98/14751 A1 | 4/1998 |

\* cited by examiner

Primary Examiner—Anjan Deb
Assistant Examiner—Reena Aurora
(74) Attorney, Agent, or Firm—Alston & Bird LLP

(57) ABSTRACT

A sensor arrangement with a first sensor (1) which comprises a measuring coil (2) that operates by the eddy current principle, and which detects the distance from a target (6), and a second sensor (3), the two sensors (1, 3) being arranged in a housing (4). To reduce the interaction of the sensors with each other, a panel (7) is positioned on the measuring side of the housing, with the panel being an active component of the second sensor (3). The second sensor is preferably a capacitive sensor, with the panel (7) being the active measuring surface of the capacitive sensor.

20 Claims, 2 Drawing Sheets

SENSOR ARRANGEMENT FOR DETECTING PROPERTIES OF A TARGET

CROSS REFERENCE TO RELATED APPLICATION

This is a continuation of copending application PCT/DE01/03031, filed Aug. 8, 2001, and which designates the U.S. The disclosure of the referenced application is incorporated herein by reference.

BACKGROUND OF THE INVENTION

The invention relates to a sensor arrangement for detecting surface properties of a metallic target and having a first sensor, which preferably comprises a measuring coil that operates by the eddy current principle, and a second sensor arranged in a common housing.

Sensor arrangements of the described type have been known from practice for a long time. For example, DE 43 27 712 C2 and corresponding U.S. Pat. No. 5,525,903 disclose a sensor arrangement for detecting properties of the surface of a metallic target. This sensor arrangement comprises a combination of an eddy current sensor and a displacement sensor. The eddy current sensor and displacement sensor are arranged along one axis, with the displacement sensor being located in the interior of the measuring coil of the eddy current sensor and parallel to the axis of the coil.

The sensor arrangement as described in the above patents is problematic, in particular to the extent that the nested arrangement of the sensors causes an interaction of the sensors with each other. This interaction subjects the measurement to errors, which are hard to correct in contrast to errors that are necessitated, for example, by temperature changes during the measurement.

It is therefore an object of the present invention to provide a sensor arrangement of the initially described type, which reduces an interaction of the sensors with each other.

SUMMARY OF THE INVENTION

The above and other objects and advantages of the invention are achieved by the provision of a sensor arrangement which comprises a housing, and first and second sensors positioned within the housing.

In accordance with the invention, it has been recognized that a correction for the interaction of sensors turns out to be extremely complicated, and that it is therefore necessary to take appropriate measures to minimize to the greatest extent errors that result from such an interaction. It has been found possible to reduce such errors by providing a panel positioned on the measuring side of the housing and which is an active component of the second sensor. Thus, it is possible to combine and even to fit within one another in a simple manner, not only different sensors, but also different sensor types, without adversely affecting the measurements to any significant extent.

As regards a particularly functional configuration, the active component could comprise at least one active measuring surface. Within the scope of a particularly complex nesting arrangement of sensors or sensor types, the active component could also comprise a plurality of measuring surfaces. This would be of advantage, in particular when the sensor arrangement comprises still further sensors in addition to the first and second sensors. It would then be possible to adapt the measuring surfaces of the individual sensors to one another separately.

The panel could be made from electrically semiconductive to electrically conductive, so that there is an especially large selection of materials, from which the panel can be made. In this case, it would be possible to adapt the material of the panel exceptionally well to the particular case of application, without requiring a limitation to materials with certain electrical properties, when selecting the material.

In a particularly advantageous manner, the electrical resistance of the panel could be known. For example, the panel could have a low ohmic electrical resistance of, for example, 100 ohms or higher. In the case of this relatively low ohmic electrical resistance of the panel, the eddy current effect in the panel is already reduced so far that the measuring coil of a sensor, for example, an eddy current sensor, is barely affected by the panel, i.e., it quasi "sees through" it.

However, the panel could also have a high ohmic electrical resistance. In the case of a high ohmic electrical resistance of the panel, an influence by eddy currents would not be detectable at all.

As regards a particularly satisfactory suitability of the panel as an active component for the second sensor or also for additional sensors, the panel could be largely made of a graphite containing material. This graphite containing material could be a resistive paste that could be imprinted and dried or baked.

Alternatively, the panel could also exhibit a very excellent electrical conductivity. In this case, the panel could be made such that it is not possible to induce eddy currents in the panel despite the excellent conductivity. This could be achieved, for example, by providing slots in the panel transversely to the flow direction of the eddy currents, i.e., radially to the axis of the measuring coil of the sensor. With that it would be possible to effectively prevent eddy currents from spreading in the panel.

However, an electrically highly conductive panel could also be made such that it permits inducing eddy currents in the panel. In a particularly advantageous manner, the intensity of the eddy currents flowing in the panel could then be known. It would then be possible to consider the intensity of the eddy currents defined, also for further measurements. In this case, the electrical field would be weakened in accordance with the formula for the depth of penetration, e.g. skin effect or shielding effect. In a further processing of the sensor signal, it would then be possible to consider and compensate the eddy currents during the measurement.

In this connection, there exists the following relation between the penetration depth of high frequency eddy currents in metallic surfaces and the frequency f of these eddy currents, the conductivity $\rho$, as well as the permeability $\mu_r$:

$$\text{Penetration depth [mm]} = 0.503 \sqrt{\frac{\rho\left[\frac{\Omega \text{mm}^2}{\text{m}}\right]}{\mu_r \cdot f \text{ [MHz]}}}$$

In this instance, the weakened field could also be used to detect an electrically conductive target in the position x. In the place of the current $$I(x)=I_o e^{-ax},$$

there would apply $$I(x)=I_1 e^{-bx}$$

in a position x, with a and b representing the two respective depths of penetration. In this case, however, prerequisite for a detection of the target would be that the thickness of the panel be substantially smaller than the hypothetical penetration depth of the eddy currents.

By means of the first sensor and/or the second sensor, it would be possible to detect a target. Thus, the detection would also be possible, when the sensor arrangement is covered with a panel of any material.

In a particularly advantageous manner, it would also be possible to detect the distance from a target by means of the first sensor and/or the second sensor. For example, the measurement of the distance from the target would make it possible to compensate to the greatest extent for errors that result from changing the distance during the measurement.

It would also be possible to detect by means of the first and/or the second sensor, a dielectric arranged between the housing and the target. In this manner, it would also be possible to measure variable media in the gap therebetween.

With respect to a particularly variable configuration of the sensor arrangement, it would be possible to arrange the measuring coil of the first sensor not only before or behind, but also around the panel or the active measuring surface.

In a particularly advantageous manner, it would be possible to realize the first sensor as an eddy current sensor or inductive sensor. As an alternative thereto, the first sensor could also be realized as an ultrasonic sensor.

In a particularly advantageous manner, the second sensor could be a capacitive sensor. This would be of special advantage, when the distance from a target is detected by means of the first sensor, since in this instance the capacitive sensor could be used to detect the volume or panel thickness of a known dielectric that is arranged between the housing and the target.

Within the scope of a particularly functional configuration, at least one further panel could be formed on the measuring side of the housing. In this case, the panels could be arranged one on top of the other. In a particularly advantageous manner, this would permit combining a plurality of sensor types, without the sensors interacting with one another. In particular, when the panel or panels forming an active component are divided into a plurality of active measuring surfaces, the sensors could also be fully functional, for example, independently of one another, or it would, for example, be possible to detect, via a target, the capacitive coupling between a plurality of surfaces.

With respect to a particularly robust construction of the sensor arrangement, the panel could be covered with a protective coating. This protective coating could be realized such that it does not affect the measurement of the sensor arrangement. This would be of special advantage, when the sensor arrangement and/or the target are in motion, and the sensor arrangement has to be suitable to withstand a contact with the target.

As regards a particularly functional and variable configuration, the two sensors could be adapted for operating independently of each other. However, it would also be possible that at least one of the two sensors would be operable independently of a plurality of other, additional sensors.

There exist various possibilities of improving and further developing the teaching of the present invention in an advantageous manner. To this end, reference may be made to the following description of preferred embodiments of the sensor arrangement according to the invention with reference to the drawings. In conjunction with the description of the preferred embodiments of the sensor arrangement with reference to the drawings, also generally preferred improvements and further developments of the teaching are explained.

DETAILED DESCRIPTION OF THE PREFERRED EMBODIMENTS

Figure 1:
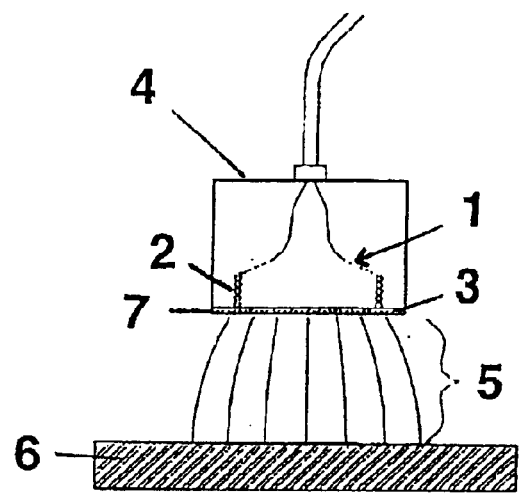
FIG. 1 is a schematic view of an embodiment of a sensor arrangement according to the invention.

FIG. 1 illustrates a sensor arrangement, which comprises a first sensor 1 with a measuring coil 2 operating by the eddy current principle, and a second sensor 3. The first sensor 1 and the second sensor 3 are arranged in a housing 4, with the housing 4 being located at a distance 5 from a target 6 which may be metallic.

In accordance with the invention, a panel 7, which forms an active component of the second sensor 3, is positioned on the measuring side of the housing 4. In this instance, the active component of the sensor 3 is an active measuring surface. The panel 7 has a low ohmic electrical resistance, which amounts to about 100 ohms. The eddy current effect in the panel 7 is therefore reduced to such an extent that the sensor is barely influenced by the panel 7, i.e., it quasi "sees through" it.

In the present embodiment, the first sensor 1 is constructed as an eddy current sensor, whose measuring coil 2 is arranged behind the panel 7. The second sensor 3 is constructed as a capacitive sensor, with the panel 7 forming the active measuring surface of the capacitive second sensor.

Figure 2:
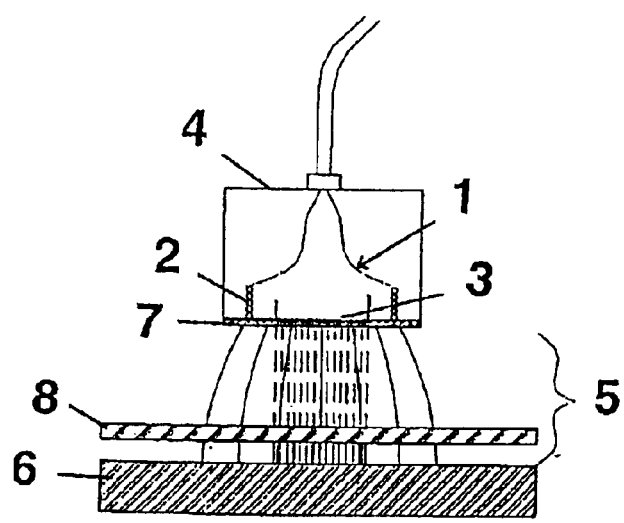
FIG. 2 is a schematic view of a further embodiment of a sensor arrangement according to the invention with a dielectric arranged between the sensor arrangement and a target.

FIG. 2 illustrates a further embodiment of a sensor arrangement according to the invention. The sensor arrangement comprises likewise a first sensor 1 with a measuring coil 2 operating by the eddy current principle, and a second sensor 3. The first sensor 1 and the second sensor 3 are arranged in a housing 4, with the housing 4 being located at a distance 5 from a target 6.

On the measuring side of the housing 4, a panel 7 is arranged, which is an active component of the second sensor 3. Likewise in this embodiment, the active component comprises an active measuring surface, which is surrounded by the measuring coil 2.

The first sensor 1 is again constructed as an eddy current sensor, and the second sensor 3 as a capacitive sensor. By means of the second sensor 3, it is possible to detect a dielectric 8 that is arranged between the housing 4 and the target 6.

In the present embodiment, the panel 7 has an excellent electrical conductivity, so that eddy currents are induced in the panel 7. These eddy currents may however be considered defined in further measurements. The electrical field is weakened in accordance with the formula for the penetration depth.

$$\text{Penetration depth [mm]} = 0.503 \sqrt{\frac{\rho\left[\frac{\Omega \text{mm}^2}{\text{m}}\right]}{\mu_r \cdot f \text{ [MHz]}}}.$$

Figure 3:
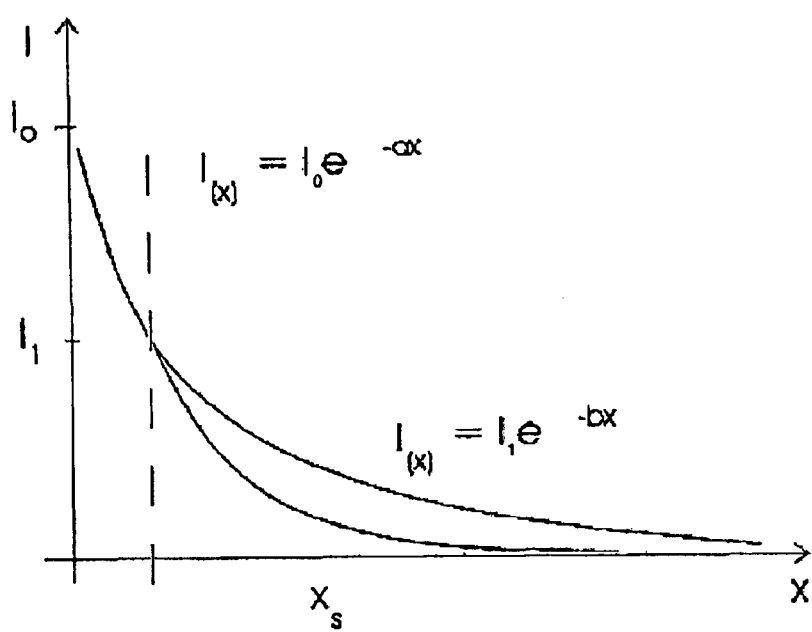
FIG. 3 illustrates an ideal current distribution in a target.

The weakening is illustrated in FIG. 3 by the position a. As a result of the eddy currents induced in the panel, the current distribution $l_0 e^{-ax}$ no longer applies in a defined position x. Instead, the weakened current $l_1 e^{-bx}$ does.

As regards further details, the general description is herewith incorporated by reference for purposes of avoiding repetitions.

Finally, it should be expressly remarked that the above described embodiments serve to explain only the claimed teaching, without however limiting it to the specific embodiments which are disclosed.

What is claimed is:

1. A sensor arrangement for detecting the properties of the surface of a target, comprising
   a housing having peripheral walls which define a measuring side of the housing at one end of the walls,
   a first sensor comprising a measuring coil and which is positioned in the housing, and
   a second capacitive sensor which includes a panel positioned on the measuring side of the housing and extending between the walls of the housing for closing the entire measuring side of the housing and which forms an active component of the second sensor.

2. The sensor arrangement of claim 1 wherein the panel comprises at least one active measuring surface.

3. The sensor arrangement of claim 1 wherein the panel comprises an electrically semiconductive to electrically conductive material.

4. The sensor arrangement of claim 1 wherein the electrical resistance of the panel is predetermined.

5. The sensor arrangement of claim 1 wherein the panel has a low ohmic electrical resistance.

6. The sensor arrangement of claim 1 wherein the electrical resistance of the panel is about 100 ohms.

7. The sensor arrangement of claim 1 wherein the panel has a high ohmic electrical resistance.

8. The sensor arrangement of claim 7, wherein the panel consists essentially of a graphite containing material.

9. The sensor arrangement of claim 8, wherein the graphite containing material is in the form of a resistive paste.

10. The sensor arrangement of claim 1, wherein the first sensor is configured to generate eddy currents.

11. The sensor arrangement of claim 10, wherein the thickness of the panel is substantially smaller than the hypothetical penetration depth of the eddy currents.

12. The sensor arrangement of claim 10, wherein the intensity of the eddy currents flowing in the panel is known.

13. The sensor arrangement of claim 1, further comprising a target that is detectable by means of the first sensor and/or the second sensor.

14. The sensor arrangement of claim 13, further comprising a dielectric arranged between the housing and the target and which is detectable by means of the second sensor.

15. The sensor arrangement of claim 1, wherein the measuring coil is arranged immediately adjacent the panel.

16. The sensor arrangement of claim 1, wherein the first sensor is an eddy current sensor, or an inductive sensor, or an ultrasonic sensor.

17. The sensor arrangement of claim 1, wherein the panel is covered with a protective coating.

18. The sensor arrangement of claim 1, wherein the two sensors are connected so that they can be operated independently of one another.

19. A sensor arrangement for detecting properties of the surface of a target, comprising
   a housing which defines a measuring side,
   a first sensor comprising a measuring coil that defines a central axis and which is positioned in the housing, and
   a second capacitive sensor positioned in the housing and which includes a one piece panel positioned on the measuring side of the housing so as to underlie the entire measuring coil in a plane substantially perpendicular to said central axis, and with the panel forming an active measuring surface of the second capacitive sensor.

20. The sensor arrangement of claim 19 wherein the first sensor is configured to operate by the eddy current principle.

* * * * *